US00RE45375E

(19) United States
(12) Reissued Patent
Harecker

(10) Patent Number: US RE45,375 E
(45) Date of Reissued Patent: Feb. 17, 2015

(54) COOKING VESSEL TOP TO PREVENT BOIL OVER OF LIQUIDS

(71) Applicant: Armin Harecker, Isen (DE)

(72) Inventor: Armin Harecker, Isen (DE)

(21) Appl. No.: 14/089,156

(22) Filed: Nov. 25, 2013

Related U.S. Patent Documents

Reissue of:
(64) Patent No.: 8,516,951
Issued: Aug. 27, 2013
Appl. No.: 12/883,594
Filed: Sep. 16, 2010

(30) Foreign Application Priority Data

Sep. 17, 2009 (DE) ..... 10 2009 041 866

(51) Int. Cl.
*A47J 37/12* (2006.01)
*B65D 51/16* (2006.01)

(52) U.S. Cl.
USPC ..... 99/403; 220/360

(58) Field of Classification Search
USPC ..... 99/403, 337; 220/578, 573.1, 780, 369, 220/367.1, 913, 305, 287, 361, 366.1, 360
See application file for complete search history.

(56) References Cited

U.S. PATENT DOCUMENTS

| | | | | |
|---|---|---|---|---|
| 204,810 | A | 6/1878 | Geary | |
| 1,436,606 | A | 11/1922 | Ritter | |
| 2,348,452 | A * | 5/1944 | Christopher | 99/347 |
| 2,506,957 | A * | 5/1950 | Gomez | 220/231 |
| 2,636,636 | A * | 4/1953 | Smith | 220/369 |
| 2,731,663 | A * | 1/1956 | Thompson | 16/422 |
| 2,751,901 | A * | 6/1956 | Livermore | 126/384.1 |
| 4,157,707 | A | 6/1979 | Koestel et al. | |
| 4,298,131 | A * | 11/1981 | Saito et al. | 220/231 |
| 4,358,992 | A * | 11/1982 | Behnisch | 99/345 |
| 5,927,183 | A | 7/1999 | Lee | |
| 6,105,811 | A | 8/2000 | Alfred | 220/369 |
| 6,125,842 | A | 10/2000 | Loyd et al. | |
| 8,020,723 | B2 * | 9/2011 | Auer et al. | 220/780 |
| 2002/0129714 | A1 * | 9/2002 | Lee et al. | 99/403 |

(Continued)

FOREIGN PATENT DOCUMENTS

| | | |
|---|---|---|
| DE | 345 153 | 12/1921 |
| DE | 541 492 | 1/1932 |

(Continued)

OTHER PUBLICATIONS

Kuhn Rikon Switzerland, Product Web-site, 2002-2012.

(Continued)

*Primary Examiner* — Dana Ross
*Assistant Examiner* — Renee L Miller
(74) *Attorney, Agent, or Firm* — Alston & Bird LLP

(57) ABSTRACT

A cooking vessel top according to the present invention is presented in that at least the contact surfaces of the cooking vessel top with the different cooking vessels are formed from an elastic material, especially silicone, that the passage opening or passage openings have at least one flat closure part connected to the cooking vessel top, which in the rest state not in contact with the boiling or foaming liquid essentially closes the passage opening or passage openings allocated to it and can be moved into an opening position by the opening force that develops on contact with the boiling or foaming liquid, in which the passage opening or passage openings are at least partially released and is configured and connected to the cooking vessel top so that it offers a slight resistance to the opening movement.

27 Claims, 1 Drawing Sheet

(56) References Cited

U.S. PATENT DOCUMENTS

| | | | | |
|---|---|---|---|---|
| 2004/0069154 | A1* | 4/2004 | Stefanoni | 99/408 |
| 2004/0200841 | A1* | 10/2004 | Seiple et al. | 220/369 |
| 2006/0096929 | A1 | 5/2006 | Repp et al. | |
| 2006/0169693 | A1* | 8/2006 | Yeung | 220/287 |
| 2007/0045304 | A1 | 3/2007 | Liang | |
| 2008/0078760 | A1* | 4/2008 | Auer et al. | 219/735 |

FOREIGN PATENT DOCUMENTS

| | | | |
|---|---|---|---|
| DE | 1 987 858 | | 6/1968 |
| DE | 1 454 165 | | 1/1969 |
| DE | 454 165 | | 1/1969 |
| DE | 87 13 234 | U1 | 11/1987 |
| DE | 87 13 234 UI | | 11/1987 |
| DE | 20 2005 007 773 | U1 | 8/2005 |
| EP | 1 466 545 | A1 | 10/2004 |
| EP | 1666368 | A1 | 6/2006 |
| FR | 737 478 | A | 12/1932 |
| WO | WO-98/08748 | | 3/1998 |
| WO | WO-2007/052889 | A1 | 5/2007 |

OTHER PUBLICATIONS

Ninetwoseven.blogspot.com; Amazon Services LLC Associates Program Amazon Product Reviews, Apr. 3, 2001.*
Kuhn Rikon Switzerland, Product Web-site, 2001-2012.*
K1—Genius GmbH Product Catalog; 2006 Issue.
K5—Photo of Genius GmbH Product; Apr. 11, 2012.

* cited by examiner

COOKING VESSEL TOP TO PREVENT BOIL OVER OF LIQUIDS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

The present application claims priority from German Patent Application No. 10 2009 041 866.0, filed Sep. 17, 2009, which is hereby incorporated herein in its entirety by reference.

BACKGROUND OF THE INVENTION

1. Field of the Invention

The invention concerns a cooking vessel top to prevent boil over of liquids.

2. Description of Related Art

The cooking vessel top of this type is designed according to DE-GM 8713234 shell-like and can be positioned on cooking vessels with different diameters. Boil over of the cooking liquid is prevented by the fact that the cooking vessel top has at least a relatively large passage opening cross section for the foaming cooking liquid. The passage openings are aligned and formed so that the cooking liquid is placed in a rotational movement and more rapid cooling of the cooking liquid is therefore achieved. The cooled cooking liquid then flows back into the cooking vessel.

To avoid lifting of the entire cooking vessel top obviously made from metal during sudden and forceful boiling of cooking liquids, like milk, the free opening cross section of the passage opening or passage openings must be very large even with high weight of the top. The greater the cross section of the passage openings, the more reliably the cooking vessel top functions. However, a large percentage of heat energy needlessly escapes through this large passage opening during the entire cooking process. In addition, even the slightest unevenness on the upper support edge of the cooking vessel or a support edge of the cooking vessel that does not lie exactly in a plane leads to liquid or foam emergence between the cooking vessel and the cooking vessel top.

The underlying task of the invention is therefore to devise a cooking vessel top of the type just mentioned, which more reliably prevents emergence of boiling or foaming liquid in different cooking vessels and guarantees an energy-saving cooking process.

SUMMARY OF VARIOUS EMBODIMENTS

This is achieved in a cooking vessel top according to the present invention in that at least the contact surfaces of the cooking vessel top with the different cooking vessels are formed from an elastic material, especially silicone, that the passage opening or passage openings have at least one flat closure part connected to the cooking vessel top, which in the rest state not in contact with the boiling or foaming liquid essentially closes the passage opening or passage openings allocated to it and can be moved into an opening position by the opening force that develops on contact with the boiling or foaming liquid, in which the passage opening or passage openings are at least partially released and is configured and connected to the cooking vessel top so that it offers a slight resistance to the opening movement.

During the cooking process the passage opening or passage openings are closed so that the cooking vessel top acts as a closed, energy-saving cover. Precisely on boiling of the liquid, i.e., when the boiling liquid comes in contact with the closure part, the cooking vessel top exerts its function as a boil over preventer, in which the boiling liquid or boiling foam forces the closure part into the opening position. This occurs rapidly, overcoming the resistance of the flat closure part to the opening movement.

Recognizably, this resistance primarily corresponds to the intrinsic weight component and secondarily to a possible deformation component of the closure part. It is also recognizable that the closure part must be as lightweight as possible and must be connected easily movable in order to guarantee rapid and reliable opening and closing of the closure part.

The boiling liquid therefore enters the shell through the opened passage opening, where energy breakdown and cooling of the boiling liquid and its return through the opened passage opening occur.

No heat energy is lost in the cooking vessel top according to the invention until the boiling point of the boiling liquid is reached. Only during hazardous boiling up of the liquid does the closure part open against the mentioned resistance force through the force of the boiling liquid. Because of the flat, lightweight closure part design connected easily movable to the cooking vessel top a situation is achieved in which its opening resistance is very limited and even a limited upward directed force component of the boiling or foaming cooking liquid therefore brings the closure part into the opening position.

It is significant here that the closure part is automatically opened only as far as necessary. The higher the pressure exerted from below, the farther the closure part opens the passage opening. The passage openings themselves can therefore be chosen relatively large without causing an energy loss. The total weight of the cooking vessel top, thanks to the sensitively reacting closure parts, can also be significantly reduced in relation to this, since this total weight does not have to be sealed against a fixed force component of the boiling or foaming cooking liquid. Instead the boiling liquid itself dictates how far the closure part is opened and which opening cross section is released.

The opening width of the closure part changes continuously during the boiling process as a reaction to the force of the boiling or foaming liquid acting there. This change in opening width, which can lead to flapping of the closure part, has the effect that the surface tension of the foaming or boiling liquid is reduced and a breakdown of the upward directed force component of the liquid occurs during boiling.

One central passage opening is then sufficient. However, several passage openings can be provided. They need only lie within the opening width of the smallest employed cooking vessel, which is usually 14 cm. The central passage opening or the several passage openings can be closed or opened by just a single closure part or several closure parts.

In order to be able to use the cooking vessel top for cooking vessels with different inside diameters, for example, from 14 cm to 24 cm, and different upper edge designs, the invention proposes an elastic material, especially silicone, at least on the contact surfaces of the cooking vessel top with the different cooking vessels, for example, in the ring areas of 14 cm, 16 cm, 18 cm, 20 cm, 22 cm and 24 cm. This also guarantees that no liquid or foam emergence occurs between the cooking vessel top and the different cooking vessels.

The designs of the cooking vessel top guarantee higher functional reliability, usability on a broader range of different cooking vessels and mean that no unnecessary energy is lost during the cooking process.

Advantageous embodiments of the cooking vessel top are described herein.

In the variant according to FIGS. 2 and 3 the passage openings are arranged in a circular ring area. This leads to a symmetric loading of the cooking vessel top during boiling up of the liquid and a simple closure part configuration. Here a disk-like closure part connected in the center to the cooking vessel top, which can also be fanned out into individual flower petal-like individual closure parts works. As an alternative, a closure part is assigned to each passage opening.

The variant according to FIG. 4 is particularly easy to manufacture. It is especially suited for the case in which the main shell body is formed from glass or metal. For example, a closure disk would be appropriate here, which is fastened to the cooking vessel top at two opposite points next to the passage opening and can tilt upward with both halves. However, as in the other arrangements of the passage openings, there are numerous possibilities here for design of the closure part. A flat closure part is also conceivable, which is connected to the cooking vessel top so that it can execute a guided, especially vertical movement.

Some embodiments of the present invention concern particularly suitable variants of the closure parts and their assignment to the passage openings.

In principle, the closure parts can be connected to the cooking vessel top so that they open radially outward or inward or tangentially or in any intermediate direction.

According to one embodiment the closure part is produced from an elastic material at least in areas. The movement behavior of the closure part can therefore be readily determined. An elastic area can form an elastic joint that can also be designed as a film hinge.

Other embodiments permit fine adjustment of the closure part with respect to its opening resistance and its mobility and sensitivity to movement.

With the design according to another embodiment a situation is achieved in which adjacent closure parts in their movement path between the rest and opening position do not jam each other but can slide one over the other.

Other embodiments concern preferred variants of the closure part that are readily suited for use in a cooking vessel top configuration. The closure parts can be simply connected in the central area to the cooking vessel top. The connected closure part ring or the connected individual closure parts then need only deform around very small connection lines in the central area, in which the central area edge is preferably made as a polygonal ring.

Means are mentioned in one embodiment with which the rigidity of the cooking vessel top can be influenced, whose central positioning on the cooking vessel can be facilitated and certain locations can be marked.

In the variant of the cooking vessel top according to another embodiment a special shaping is chosen. If the closure part follows this shaping, which is recommended according to one embodiment, this responds particularly easily and sensitively to the boiling liquid. Since the outer closure area after a direction reversal grades into the obliquely outward and downward sloped edge section, the boiling liquid is trapped on the outer closure part area and acts on a large contact surface and with a large lever arm on the closure part.

According to another embodiment the cooking vessel top can be provided with metal inserts or rings. In particular, if these are made from silicone, this has an effect on its weight and its rigidity. The inserts or rings are preferably enclosed by silicone. Additional forces can also be exerted on the cooking vessel top when a permanent magnet is brought into its vicinity. Magnetic additional weights or grips could also be used. If the latter is not desired, the rigidity can also be influenced by harder plastic inserts or rings.

If the cooking vessel top according to one embodiment is entirely made of silicone, it is adaptable flexibly and easily to any edges of cooking vessels. It can even be used in cooking vessels with pouring spots, especially by positioning of an additional weight, for example, according to one embodiment.

If the cooking vessel top is to be used for cooking vessels with very large inside diameters, for example, 28 cm or more, it is recommended that a simply configured adapter ring be used. The production and keeping in stock of different sizes of the complicated cooking vessel top can therefore be dispensed with.

BRIEF DESCRIPTION OF THE SEVERAL VIEWS OF THE DRAWINGS

A practical example of the cooking vessel top according to the invention is described below with reference to the drawing. In the drawing.

DETAILED DESCRIPTION

Figure 1:
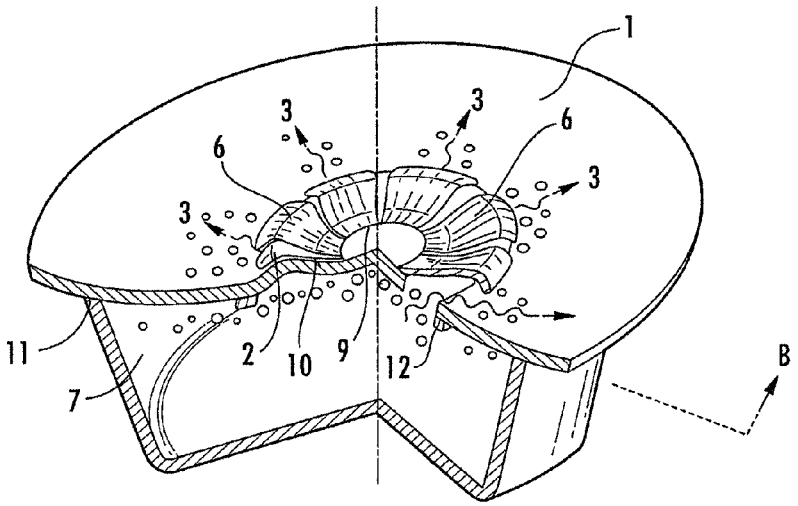
FIG. 1 shows a cooking vessel top with open and closure parts on a cooking vessel, in which one-fourth is cut out for better depiction.
Figure 2:
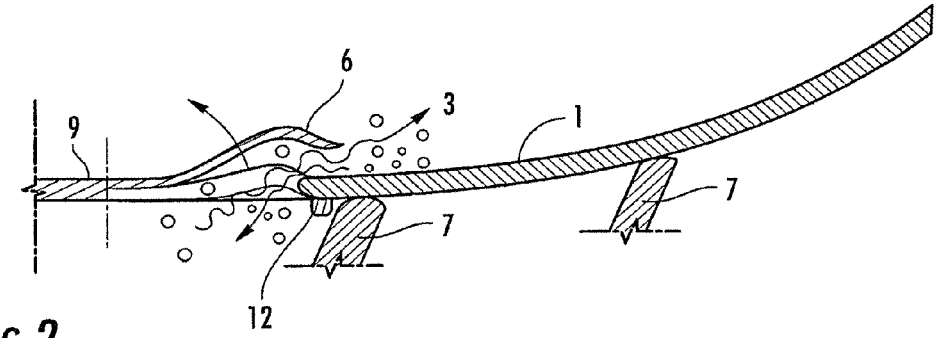
FIG. 2 shows a cross section through a half of the cooking vessel top according to the sectional view B in FIG. 1.

The cooking vessel top positioned on a cooking pot depicted in FIGS. 1 and 2 is completely formed from silicone and has a horizontal, disk-shaped central area which is bounded by six sides of a polygon. Six passage openings (2) uniformly distributed within a circular ring are connected outward, between which a connector (10) is present. The passage openings (2) have essentially an outline similar to a cake slice with a cutoff tip. In addition to this line (9) forming the cutoff tip, which is connected as a regular hexagon to the mentioned central area, the closure parts (6) are no longer joined to the cooking vessel top and therefore form individual closure parts (6). These hexagon sides therefore each form a type of pivot axis for the individual closure parts (6). The mentioned circular ring in which the passage openings (2) are arranged initially still runs horizontally in connection with the central area, then rises forming a dome ring and then drops downward again when viewed in cross section, where it grades into the outer area of the shell form. The closure parts (6) have essentially the same shape as the passage openings (2) and the cooking vessel top (1) in the area of the passage openings (2) in which, however, they are slightly overlapped and therefore in the rest position lie on the connectors (10) and the radial outer passage opening edge. The individual closure parts (2) have a spacing relative to each other above the connectors (10) so that a movement trend free of interference is guaranteed for passage openings (2). Tilting of closure parts (2) up and down free of disturbance is further favored by the fact that their thickness diminishes toward the free edges. Closure parts therefore slide one over the other and do not mutually interfere during their tilting movement.

In this case a component is made, which comprises the polygonal central area with the flower petal-like closure part (6) shaped as described above, connected to it. This component is mounted on the polygonal central area of the cooking vessel top and connected to it so that a one-piece component is produced.

Figure 3:
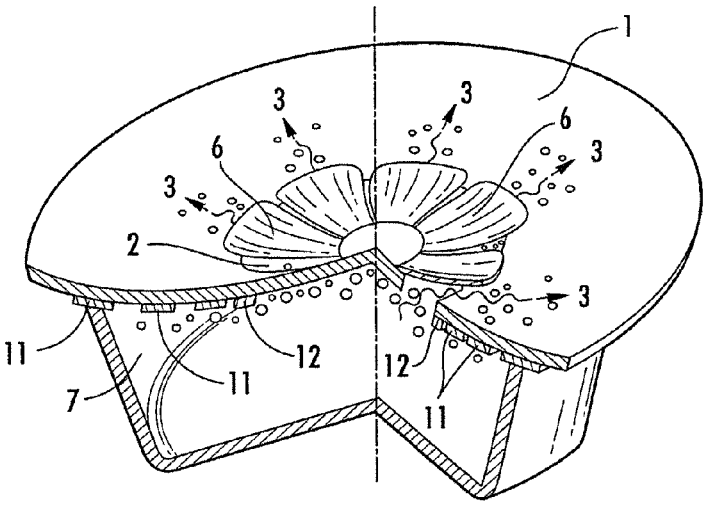
FIG. 3 shows another embodiment of a cooking vessel top with open and closure parts on a cooking vessel, in which one-fourth is also cut out here for better depiction.

The closure parts (6) are shown in the opened position in the figures. The section of the quarter cut out for better depiction in FIGS. 1 and 3 is chosen so that the left edge of the quarter is guided through a connector (10) and the right edge of the quarter runs between two connectors (10). In the opened position the closure parts (6) have been raised by the upward boiling liquid (3) against their opening movement resistance, in which the opening movement resistance results mainly from the intrinsic weight component and at best slightly from the deformation resistance of the closure part (2) in the area of the connection line (9) forming the pivot axis.

Immediately on impingement of the boiling or foaming liquid (3) on the closure part (2) it tilts upward and releases a path into the trapping shell for the boiling liquid (3). This boiling process can run very turbulently, in which the closure part (2) reacts sensitively to any different opening pressure of the liquid so that the opening cross section between the passage opening and the shell is opened precisely as far as necessary. It is again ensured that no unnecessary energy is consumed and that the surface tension or even skin formation of the boiled up liquid is reduced under the alternating back-and-forth movement of the closure part (6) acting as a flap.

Backflow of the liquid cooled in the shell occurs beneath the liquid flowing through the passage openings (2).

Boil over is then also suppressed in a persistent boiling process.

The essential opening positioning of the closure parts (6) remains as long as sufficient energy is supplied from the cooking site. If energy supply is cut off, the closure parts (6) move back into their rest position. If energy supply is further increased, the opening process is initiated again.

This interaction could continuously repeat without having to fear boil over from the cooking vessel top.

In the cooking vessel top (1) according to FIG. 3 the shell is made from a hard material, for example, glass or aluminum. In principle, as shown in FIG. 1 it could also be formed from silicone. The cooking vessel top (1) has a simple-to-produce uniform shell shape from its center to the edge. As in the variant according to FIG. 1, six passage openings (2) are arranged uniformly distributed in this practical example. They have essentially a profile similar to a cake slice with beveled tip and are spaced from each other to form connectors (10) and lie between a circular ring of less than 14 cm in a central area of the cooking vessel top (1). These passage openings are allocated a thin-walled disk-like closure part (6) also with a central area and individual connection parts (6) joined to it so that a flower-like structure is formed. The wall of the disk-like closure part (6) in its rest position is adapted to the shell shape and lies on the shell shape. The central area of the disk-like closure part (6) can be smaller than, equal to or larger than the central area of the shell. In the depicted example both central areas are designed the same and circular, the circle forming the connection lines (9). Both central areas are joined to each other over the entire surface so that the cooking vessel top is in one piece.

As an alternative, it would also be possible to provide a simply configured closure disk in the shape of a circular disk, which overlaps the passage openings in profile and whose circular edge lies on the shell shape in the rest state and therefore can be arbitrarily shaped within this contact surface, in which its opening position is achieved by the fact that the edge of the closure disk is raised from a shell shape and then exposes the liquid passage preferably for several or all passage openings. This raising can be achieved by the fact that the disk edge is bent upward by the boiling liquid. This raising as an alternative could be achieved by the fact that the closure disk is connected vertically movable with the cooking vessel top and the entire closure disk is raised.

In order to reliably prevent liquid escape between the cooking vessel (7) and the cooking vessel top (1) along the contact surfaces (11) in the practical example according to FIG. 3 the elastic silicone ring areas are provided on the bottom of the shell shape with diameters that correspond to the usual cooking vessel diameters. In addition to the innermost silicone ring area, knobs (12) are also provided on the bottom of the shell, which permit central positioning of the cooking vessel top on the cooking vessel.

The cooking vessel, achievement of the opening movement of the closure part and its return movement to the rest state occur similar to the processes described for FIGS. 1 and 2.

As already mentioned, the cooking process can run very turbulently. The cooking vessel top also prevents in this case unduly severe spraying and therefore soiling of the cooking location resulting from this. The cooking vessel top can naturally be easily used as a cover or lid for cooked or roasted products that do not tend to overcook and/or for any type of cooking or roasting utensil.

What is claimed is:

1. A cooking vessel top to prevent boil over of liquids, said cooking vessel top comprising:

a concave member having at least one passage opening for liquid, wherein at least one closure part is allocated to the passage opening or the passage openings, the closure part configured to essentially close the corresponding passage opening or the passage openings in the rest state when not in contact with the boiling or foaming liquid and configured to be moved into an opening position by the opening force that develops on contact with the boiling or foaming liquid, in which the respective passage opening or passage openings are at least partially released so as to allow the boiling liquid to enter the concave member through the opened passage opening or openings and return through the opened passage opening or openings, wherein the cooking vessel top can be positioned on cooking vessels with different diameters, wherein at least the contact surfaces of the cooking vessel top relative to the different cooking vessels are formed from an elastic material, and wherein the closure part or parts are formed at least in areas from the elastic material, are connected to the cooking vessel top, and are configured so that the closure part or parts offer slight resistance to the opening force and allow the opening force to overcome the intrinsic weight component and the deformation component of the closure part.

2. The cooking vessel top according to claim 1, wherein several passage openings are provided in a circular ring area between a central area and an outer ring area of the cooking vessel top.

3. The cooking vessel top according to claim 2, wherein several passage openings are arranged with central symmetry when viewed in profile and are formed essentially in the form of a circular sector, and wherein the cooking vessel top further comprises radial connectors disposed between the radial sides of the passage openings, which extend from the central area to the outer ring area away from the center.

4. The cooking vessel top according to claim 1, wherein a central passage opening is provided.

5. The cooking vessel top according to claim 1, wherein a closure part is allocated to each passage opening.

6. The cooking vessel top according to claim 1, wherein a closure part is allocated to several or all passage openings.

7. The cooking vessel top according to claim 1, wherein at least the contact edges of the closure part or the closure parts essentially correspond to the shape of the cooking vessel top there.

8. The cooking vessel top according to claim 1, wherein the passage opening(s) allocated to closure part or closure parts overlap.

9. The cooking vessel top according to claim 1, wherein two adjacent closure parts are allocated to each passage opening, in which the edges of the adjacent part lie against each other or overlap in the area of the passage opening.

10. The cooking vessel top according to claim 1, wherein the closure part or parts are configured to be moved flap-like between the rest position and the opening position.

11. The cooking vessel top according to claim 1, wherein the closure part comprises at least one feature selected from the group consisting of ribs and notches.

12. The cooking vessel top according to claim 1, wherein the thickness of a closure part diminishes toward its free edges not connected to the cooking vessel top.

13. The cooking vessel top according to claim 1, wherein the closure part acts as a membrane valve, wherein a central area of the closure part is connected to the cooking vessel top and essentially closes the passage opening or passage openings in the rest state with a ring area connected to the closure part.

14. The cooking vessel top according to claim 1, wherein the closure part acts as a membrane valve, wherein individual closure parts each allocated to a passage opening are formed in a ring area connected to a central area of the cooking vessel top and, which essentially close the corresponding passage opening in the rest state.

15. The cooking vessel top according to claim 13, wherein the membrane valve-like closure part is formed as a separate component that is configured to be connected to the rest of the cooking vessel top.

16. The cooking vessel top according to claim 1, wherein the area of the cooking vessel top that has the passage opening(s) with the allocated closure part is designed as a component that is configured to be connected to the rest of the cooking vessel top part.

17. The cooking vessel top according to claim 1, wherein at least one closure part has a contact surface which at the end of movement from the opening position into the rest position with an additional contact surface formed on the edge of passage opening, preferably a sloping surface or stop knob in its movement path, enters into effective connection and therefore permits only an opening direction.

18. The cooking vessel top according to claim 1 further comprising at least one feature selected from the group consisting of, ribs, notches, and knobs.

19. The cooking vessel top according to claim 1, wherein the cooking vessel top has roughly the shape of a dinner plate, in which an inner central area is provided to which an upward sloping edge area is connected outward.

20. The cooking vessel top according to claim 1, wherein viewed in cross section from the inside out the cooking vessel top has an essentially horizontally running central area, then a ring section with rising slope, then a dome section, then a downward dropping ring section, and then again a second upward rising ring section up to the cooking vessel top edge.

21. The cooking vessel top according to claim 20, wherein the passage openings extend from the inner central area to the outer area of the downward dropping ring section or to the inner area of the second rising ring section.

22. The cooking vessel top according to claim 1, wherein the outermost edge of the cooking vessel top comprises an edge elevation section that is directed steeply upward.

23. The cooking vessel top according to claim 1 further comprising at least one feature that responds to permanent magnets selected from the group consisting of a metal insert and ring.

24. The cooking vessel top according to claim 1, wherein the cooking vessel top is formed entirely from silicone.

25. The cooking vessel top according to claim 1, wherein the concave member is formed from glass or metal.

26. The cooking vessel top according to claim 1, wherein a loading piece or handle piece preferably provided with a permanent magnet is configured to be positioned or suspended on the cooking vessel top.

27. The cooking vessel top according to claim 1, wherein an adapter ring is inserted between the cooking vessel and the cooking vessel top, in which at least its contact surfaces with the cooking vessel are formed with different diameters, from an elastic material, especially silicone.

* * * * *